United States Patent
Huang et al.

(10) Patent No.: US 9,612,578 B2
(45) Date of Patent: Apr. 4, 2017

(54) WEARABLE ELECTRONIC DEVICE

(71) Applicant: Acer Incorporated, New Taipei (TW)

(72) Inventors: Yu-Cheng Huang, New Taipei (TW); Shao-Chi Chuang, New Taipei (TW); Sheng-Wen Wu, New Taipei (TW); Tsung-Hsun Wu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/830,737

(22) Filed: Aug. 20, 2015

(65) Prior Publication Data

US 2016/0349707 A1    Dec. 1, 2016

(30) Foreign Application Priority Data

May 26, 2015 (TW) .............................. 104116816 A

(51) Int. Cl.
*A45F 5/00* (2006.01)
*G04G 17/00* (2013.01)
*G04B 37/14* (2006.01)
*G06F 1/16* (2006.01)
*G04G 17/08* (2006.01)

(52) U.S. Cl.
CPC ......... *G04B 37/1486* (2013.01); *G06F 1/163* (2013.01); *A45F 2005/008* (2013.01); *A45F 2200/0516* (2013.01); *G04B 37/1413* (2013.01); *G04G 17/08* (2013.01)

(58) Field of Classification Search
CPC ....... A45F 2005/008; A45F 2200/0516; G04G 17/08; G04B 37/1413; G04B 37/005
USPC ........................................ 224/219, 221, 930
See application file for complete search history.

(56) References Cited

U.S. PATENT DOCUMENTS

| | | | | |
|---|---|---|---|---|
| 5,008,864 A | * | 4/1991 | Yoshitake | G04B 47/025 368/10 |
| 5,102,023 A | * | 4/1992 | Nguyen | A41F 9/002 224/152 |
| 5,392,261 A | * | 2/1995 | Hsu | G04B 37/1413 368/281 |
| 5,657,201 A | * | 8/1997 | Kochis | G06F 1/1632 224/219 |
| 5,657,298 A | * | 8/1997 | Choay | G04B 37/1486 368/276 |

(Continued)

FOREIGN PATENT DOCUMENTS

CN          101098636      10/2010

*Primary Examiner* — Justin Larson
(74) *Attorney, Agent, or Firm* — Jianq Chyun IP Office

(57) ABSTRACT

A wearable electronic device including a body having a first locking recess, a wearable element having a second locking recess and a locking structure disposed in one of the first and the second locking recesses and including a pressing element and a locking element connected with each other is provided. The locking element is adapted to lock another one of the first locking recess and the second locking recess to assemble the body and the wearable element together, and the pressing element is adapted to receive an external force and move along a vertical axial direction into the first locking recess or the second locking recess which the locking structure is located, and drive the locking element to move along a horizontal axial direction into the first locking recess or the second locking recess which the locking structure is located, so as to unlock the body and the wearable element.

9 Claims, 4 Drawing Sheets

(56) References Cited

U.S. PATENT DOCUMENTS

| | | | | |
|---|---|---|---|---|
| 5,730,342 A * | 3/1998 | Tien | | A45F 5/02 224/197 |
| 5,899,370 A * | 5/1999 | Bould | | A44C 5/0053 224/164 |
| 6,283,348 B1 * | 9/2001 | Wang | | A45F 5/02 224/197 |
| 6,955,279 B1 * | 10/2005 | Mudd | | A45F 5/02 224/197 |
| 6,971,789 B2 * | 12/2005 | Nakamura | | G04G 17/02 368/281 |
| 7,032,791 B2 * | 4/2006 | Stotts | | A45F 5/02 224/269 |
| 7,226,321 B2 * | 6/2007 | Uhari | | G04G 17/08 439/752 |
| 7,458,489 B1 * | 12/2008 | Mudd | | A45F 5/02 224/197 |
| 7,780,047 B2 * | 8/2010 | Chen | | A45C 13/26 224/218 |
| 7,793,361 B2 * | 9/2010 | Ishihara | | A41D 1/002 2/170 |
| 7,946,758 B2 * | 5/2011 | Mooring | | G04B 37/005 368/276 |
| 8,260,384 B2 | 9/2012 | Wulff et al. | | |
| 8,292,493 B2 * | 10/2012 | Mooring | | G04B 37/005 368/276 |
| 8,345,412 B2 * | 1/2013 | Maravilla | | A45F 5/00 224/219 |
| 8,408,436 B2 * | 4/2013 | Berry | | A63B 24/00 224/176 |
| 8,428,664 B1 | 4/2013 | Wyers | | |
| 8,506,158 B2 * | 8/2013 | Keung | | A44C 5/0084 224/164 |
| 8,967,437 B2 * | 3/2015 | Wilson | | A45F 5/00 224/152 |
| 9,004,329 B2 * | 4/2015 | Hsieh | | G04G 17/08 224/169 |
| D752,579 S * | 3/2016 | Lee | | D14/344 |
| 2002/0158096 A1 * | 10/2002 | Wang | | A45F 5/02 224/271 |
| 2006/0171261 A1 * | 8/2006 | Ruchonnet | | G04B 37/00 368/281 |
| 2009/0257323 A1 * | 10/2009 | Soltani | | G04B 37/0427 368/281 |
| 2010/0302913 A1 * | 12/2010 | Loiseau | | G04B 37/0427 368/281 |
| 2013/0001263 A1 * | 1/2013 | Kai | | A44C 5/0007 224/219 |
| 2013/0206801 A1 * | 8/2013 | Delgatty | | A45F 5/00 224/219 |
| 2015/0076201 A1 * | 3/2015 | Young | | H04M 1/05 224/576 |
| 2015/0305457 A1 * | 10/2015 | Okano | | H04B 1/385 224/219 |
| 2015/0342308 A1 * | 12/2015 | Wilson | | A45F 5/00 224/219 |
| 2015/0359321 A1 * | 12/2015 | Wu | | G09F 3/005 224/219 |

* cited by examiner

WEARABLE ELECTRONIC DEVICE

CROSS-REFERENCE TO RELATED APPLICATION

This application claims the priority benefit of Taiwan application serial no. 104116816, filed on May 26, 2015. The entirety of the above-mentioned patent application is hereby incorporated by reference herein and made a part of this specification.

BACKGROUND OF THE INVENTION

1. Field of the Invention

The invention relates to an electronic device, and particularly relates to a wearable electronic device.

2. Description of Related Art

In recent years, due to the development in the technology industries, electronic devices such as notebook computers (NB), tablet PCs, and smart phones are commonly used in our daily lives. As the types and functions of the electronic devices are more and more variable, the convenience and usefulness of these electronic devices make these devices more popular and able to cope with the user's needs for different purposes. For example, owing to the development in the technology of miniaturization and the awareness of health care, wearable electronic devices, such as smart watch, are provided for the users to wear with ease, and relevant technologies have been developed rapidly and are becoming matured.

Taking the smart watch as an example, a wearable electronic device roughly includes a body and a wearable element. The body is a main part of the wearable electronic device where relevant operations are performed, while the wearable element is adapted to fix the body to the user, and is disposed on the user's wrist, for example. Therefore, after being produced, the body and the wearable element of the conventional wearable electronic device are not detachable. To make the wearable element of the wearable electronic device replaceable based to meet the needs, a lock may also be disposed on the body to lock the wearable element. However, assembling and detaching processes of the lock usually require an additional tool and are not convenient for the user to operate on his/her own.

SUMMARY OF THE INVENTION

The invention provides a wearable electronic device that allows to replace a wearable element through simpler assembling and detaching processes.

The wearable electronic device of the invention includes a body, a wearable element, and a locking structure. The body has a first locking recess. The wearable element has a second locking recess. The locking structure is disposed in one of the first locking recess and the second locking recess. The locking structure includes a pressing element and a locking element connected to each other. The locking element is adapted to lock another of the first locking recess and the second locking recess to assemble the body and the wearable element together. The pressing element is adapted to receive an external force to move along a vertical axial direction into the first locking recess or the second locking recess where the locking structure is located, and drives the locking element to move along a horizontal axial direction perpendicular to the vertical axial direction into the first locking recess or the second locking recess where the locking structure is located, so as to unlock the body and the wearable element.

Based on above, in the wearable electronic device of the invention, the locking structure may be disposed in the first locking recess of the body or the second locking recess of the wearable element. Also, the locking element may lock the other of the first locking recess and the second locking recess to assemble the body and the wearable element together. When the user intends to detach the wearable element and the body, the user may apply a force to the pressing element, so that the pressing element moves into the first locking recess or the second locking recess where the locking structure is located and drives the locking element to move into the first locking recess or the second locking recess where the locking structure is located, thereby unlocking the body and the wearable element. Accordingly, the wearable element of the wearable electronic device of the invention may be replaced through simpler assembling and detaching processes.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
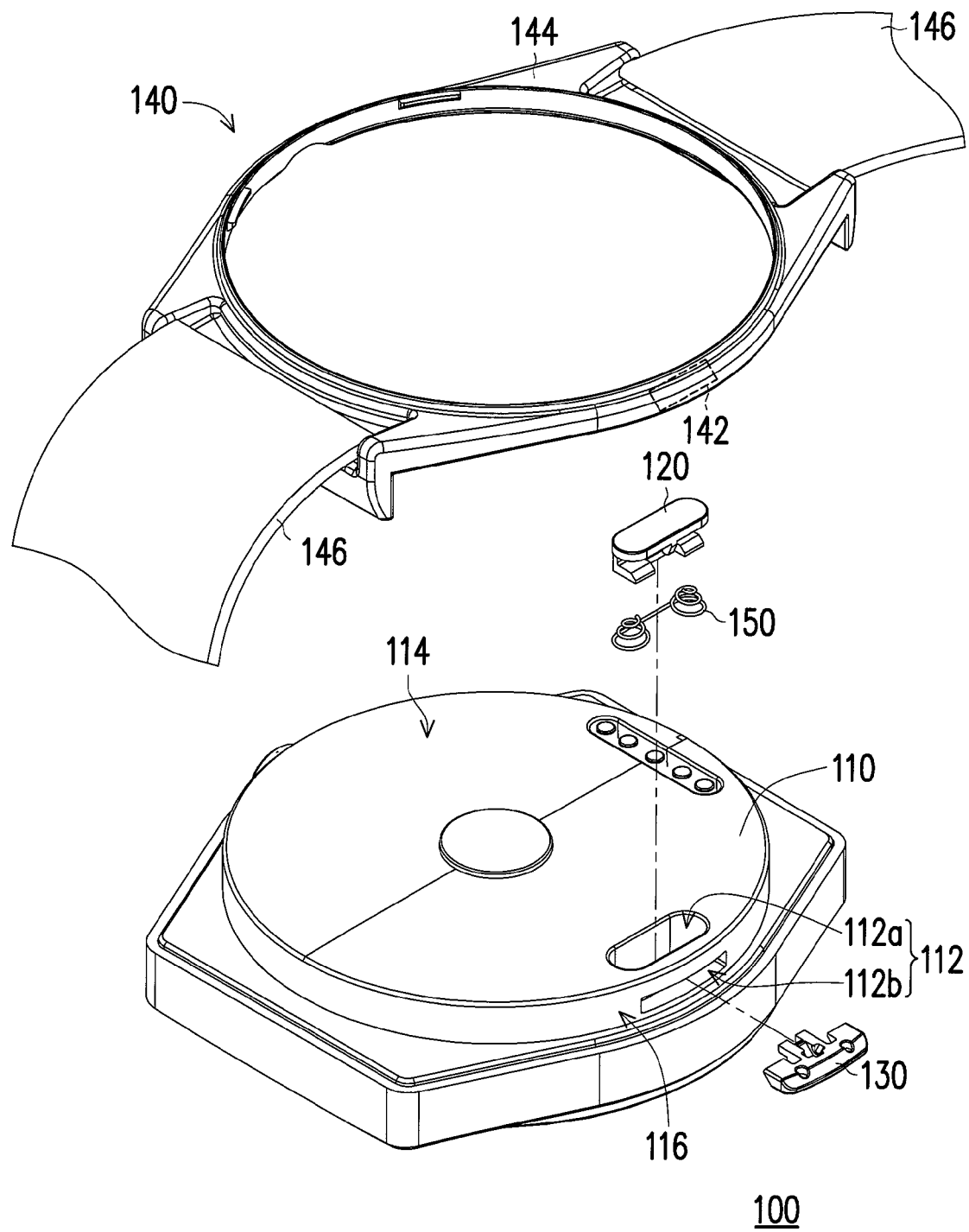
FIG. 1 is a schematic view illustrating a wearable electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
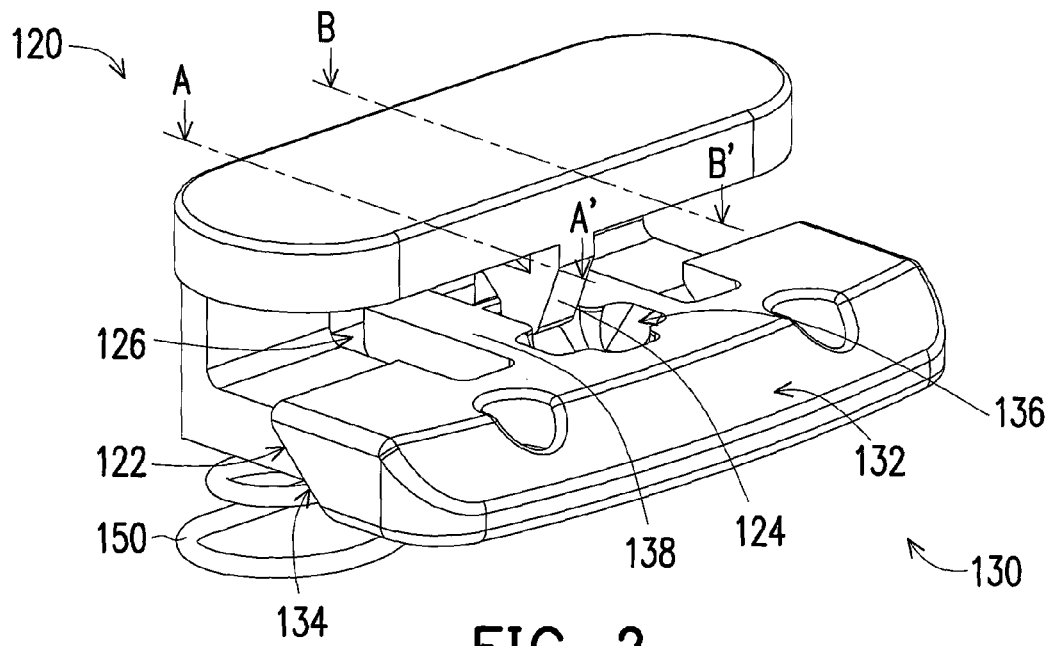
FIG. 2 is a schematic partial view of the wearable electronic device shown in FIG. 1.
Figure 3:
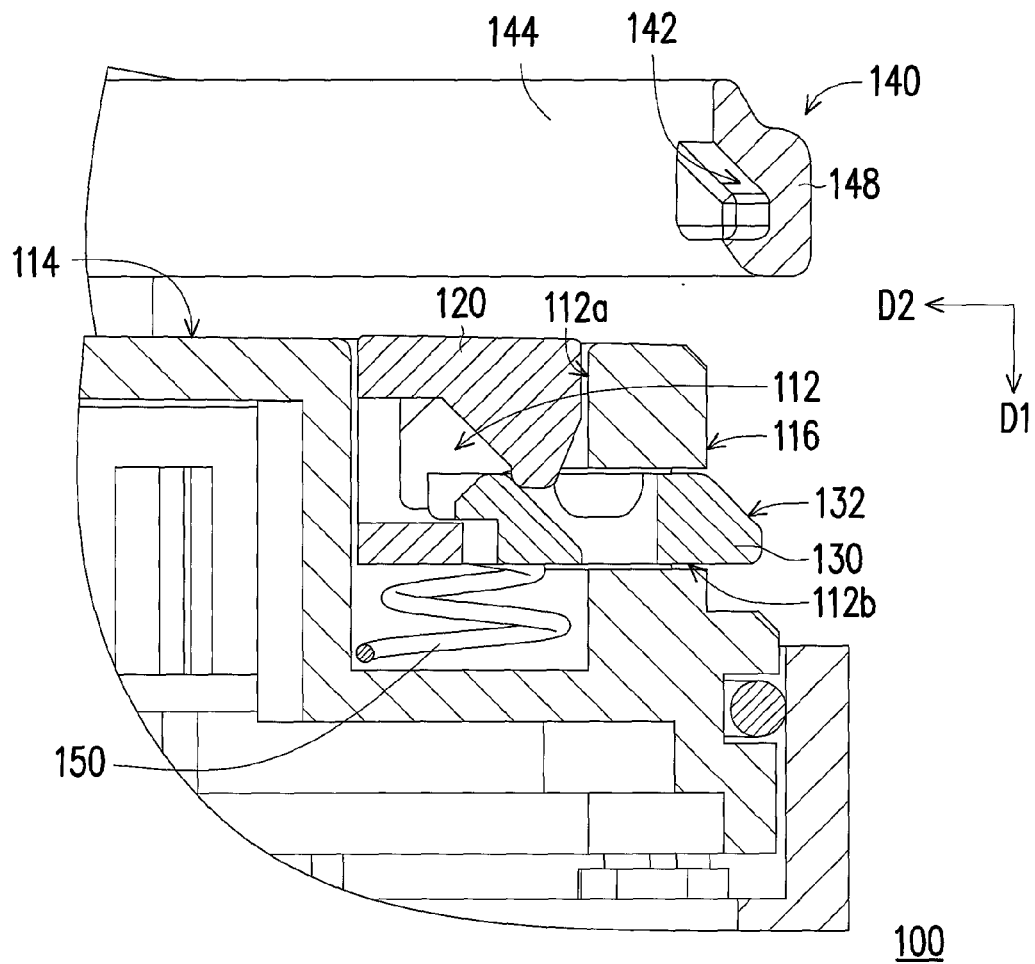
FIGS. 3 to 5 are schematic partial cross-sectional views illustrating a plurality of operating states of the wearable electronic device shown in FIG. 2.
Figure 4:
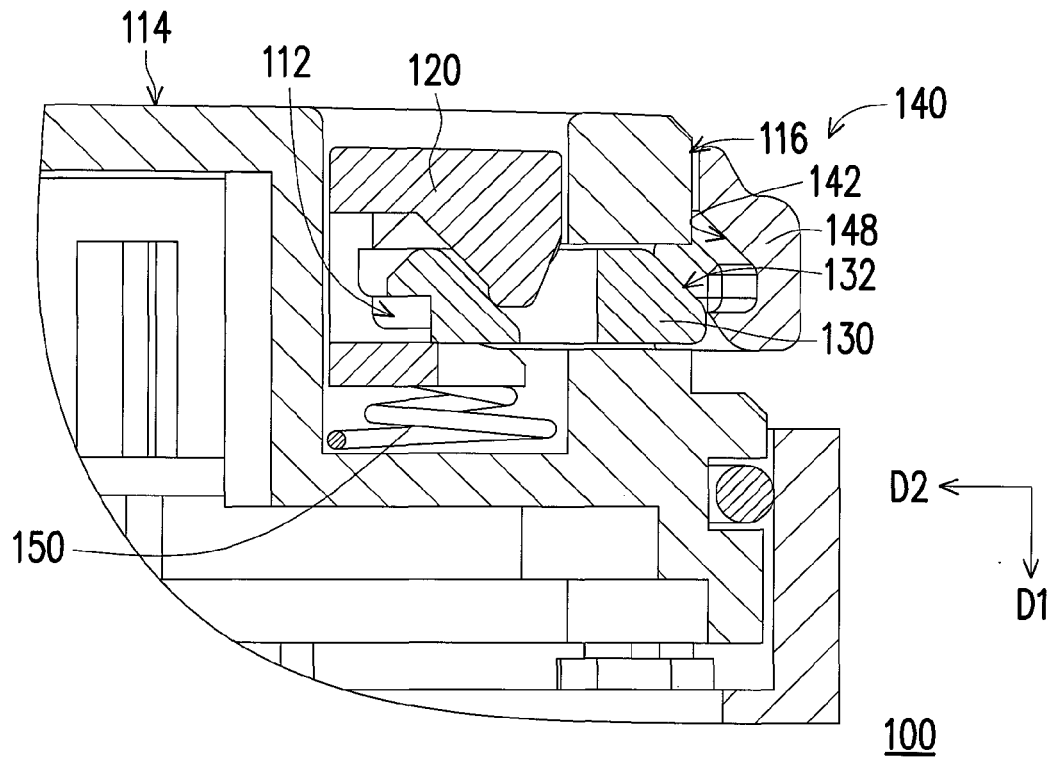
Figure 5:
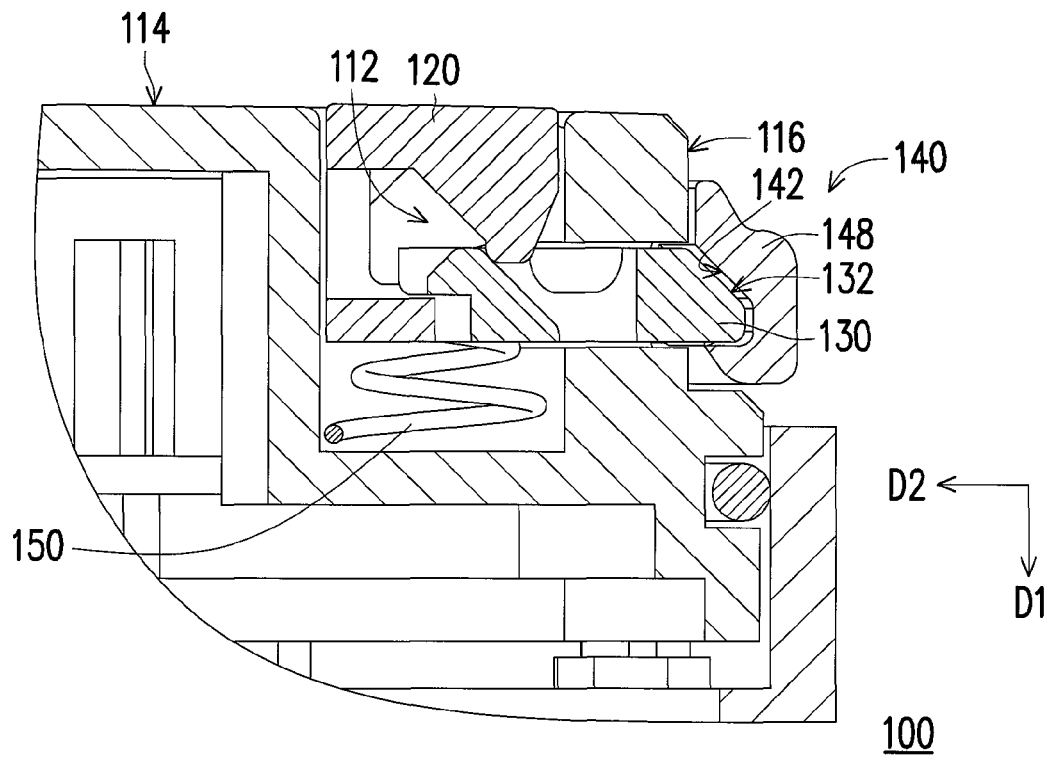

FIG. 1 is a schematic view illustrating a wearable electronic device according to an embodiment of the invention. FIG. 2 is a schematic partial view of the wearable electronic device shown in FIG. 1. FIGS. 3 to 5 are schematic partial cross-sectional views illustrating a plurality of operating states of the wearable electronic device shown in FIG. 2. Referring to FIGS. 1-3, in this embodiment, a wearable electronic device 100 includes a body 110, a locking structure (including a pressing element 120 and a locking element 130), and a wearable element 140. The body 110 includes a processing unit, a circuit board, a battery, a display panel, a touch panel, and/or other applicable electronic components not shown herein. The electronic components aforementioned are disposed in a case and perform relevant functions. The wearable element 140 is detachably assembled to the body 110. In this way, the user may wear the wearable electronic device 100. For example, the wearable electronic device 100 may be a smart watch, for example, wherein the body 110 is a watch body, and the wearable element 140 may be a frame and a watch strap, for example. However, the invention does not intend to limit the types of the wearable electronic device 100 and configurations of the body 110 and the wearable element 140. The body 110 and the wearable element 140 may be assembled or detached based on practical needs, and assembling and detaching processes may be achieved with the locking structure (including the pressing element 120 and the locking element 130).

Specifically, in this embodiment, the body 110 has a first locking recess 112 located at a bottom part 114 and a side part 116 of the body 110. Similarly, the wearable element 140 includes a second locking recess 142 and is located at an inner side of the wearable element 140. The first locking recess 112 and the second locking recess 142 correspond to each other. In addition, the locking structure includes the pressing element 120 and the locking element 130 connected to each other. The locking structure is disposed in one of the first locking recess 112 and the second locking recess 142, and is adapted to lock another one of the first locking recess 112 and the second locking recess 142 to assemble the body 110 and the wearable element 140 together.

For example, in this embodiment, the locking structure (including the pressing element 120 and the locking element 130) is disposed in the first locking recess 112 and is adapted to lock the second locking recess 142. More specifically, the first locking recess 112 has two end openings 112a and 112b respectively corresponding to the bottom part 114 and the side part 116 of the body 110. The pressing element 120 is disposed at the end opening 112a of the first locking recess 112 and corresponds to the bottom part 114 of the body 110. The locking element 130 is disposed at the other end opening 112b of the first locking recess 112 and corresponds to the side part 116 of the body 110. The pressing element 120 may move along a vertical axial direction D1 in the end opening 112a, the locking element 130 may move along a horizontal axial direction D2 in the end opening 112b, and the pressing element 120 and the locking element 130 are connected to each other. Accordingly, the first locking recess 112 may be configured as an L shape, while the pressing element 120 and the locking element 130 are respectively disposed in the end openings 112a and 112b of the first locking recess 112. In addition, the pressing element 120 and the locking element 130 respectively correspond to the bottom part 114 and the side part 116. Thus, the pressing element 120 and the locking element 130 may be linked to each other in the vertical axial direction D1 and the horizontal axial direction D2 that are perpendicular to each other.

Besides, in this embodiment, the locking structure further includes a restoring element 150 disposed between the pressing element 130 and the first locking recess 112 or the second locking recess 142 where and the locking structure is located. In this embodiment, the restoring element 150 is disposed between the pressing element 130 and the first locking recess 112. The restoring element 150 is a spring, for example. However, the invention does not intend to limit the types and number of the restoring element, and the types and number of the restoring element may be adjusted based on practical needs. A restoring force of the restoring element 150 accumulates when the pressing element 120 moves along the vertical axial direction D1 into the first locking recess 112 or the second locking recess 142 where the locking structure is located (e.g., the first locking recess 112). Also, the restoring element 150 drives the pressing element 120 to restore to an original position in an opposite direction along the axial direction D1 by releasing the restoring force.

Thus, in this embodiment, the locking element 130 is adapted to lock the other of the first locking recess 112 and the second locking recess 142 (e.g., the second locking recess 142) other than the one where the locking structure is located, so that the body 110 and the wearable element 140 are assembled together. The pressing member 120 is adapted to receive an external force and move along the vertical axial direction D1 into the first locking recess 112 or the second locking recess 142 where the locking structure is located (e.g., the first locking recess 112), and drive the locking element 130 to move along the horizontal axial direction D2 perpendicular to the vertical axial direction D1 into the first locking recess 112 or the second locking recess 142 where the locking structure is located (e.g., the first locking recess 112) to unlock the body 110 and the wearable element 140.

More specifically, the wearable element 140 of this embodiment includes an annular frame 144 and two wearable parts 146 (shown in FIG. 1). The wearable parts 146 are watch straps, for example, and are correspondingly disposed at two opposite outer sides of the annular frame 144. However, the invention does not intend to limit the number and configurations of the wearable parts 146. In addition, the first locking recess 112 is located at an outer side of the body 110, while the second locking recess 142 is located at an inner side of the annular frame 144. Accordingly, the body 110 is adapted to be disposed inside the annular frame 144 and is assembled to the wearable element 140 by having the locking element 130 lock the second locking recess 142. When the user wishes to detach the wearable element 140 from the body 110, the user may apply a force to the pressing element 120, so as to drive the locking element 130 to be unlocked from the wearable element 140.

In this embodiment, the pressing element 120 and the locking element 130 are disposed to the bottom part 114 and the side part 116 of the body 110, so that when the wearable element 140 is assembled to the body 110, the annular frame 144 of the wearable element 140 surrounds the side part 116 of the body 110, and an input/output interface, such as a display panel or a touch panel, may be disposed as an operation area at a top part (not shown) of the body 110 opposite to the bottom part 114. Thus, by disposing the locking element 130 at the side part 116, the locking element 130 may correspondingly lock the second locking recess 142 at the inner side of the annular frame 144 of the wearable element 140, so that the annular frame 144 of the wearable element 140 surrounds the side part of the body 110. The pressing element 120 is disposed at the bottom part 114, so that the wearable electronic device 100 may be detached after the user takes it off and applies a force on the pressing element 120. Besides, the configuration of the pressing element 120 does not influence locking of the side part 116 and the user's operation at the top part. Thus, the pressing element 120 and the locking element 130 linked to each other are configured as an L shape and respectively accommodated in the first locking recess 112 having the end openings 112a and 112b at the bottom part 114 and the side part 116. In addition, the pressing element 120 is limited by the end opening 112a and only movable along the vertical axial direction D1, while the locking element 130 is limited by the end opening 112b and only movable along the horizontal axial direction D2.

The design characteristics of the first locking recess 112 and the second locking recess 142 (e.g., the first locking access 112 having an L shape and two end openings 112a and 112b) may be switched, such that the locking structure (including the pressing element 120, the locking element 130, and the restoring element 150) are disposed in the second locking recess 142 and lock the first locking recess 112, and the body 110 and the wearable element 140 may still be assembled together with the locking structure. In the following, assembling and detaching of the body 110 and the wearable element 140 are described in detail with reference to FIGS. 1 and 2 accompanied by each of FIGS. 3 to 5. Subsequent assembling and detaching processes of this embodiment are described based on an example that the locking structure (including the pressing element 120, the locking element 130, and the restoring element 150) is disposed at the first locking recess 112 and lock the second locking recess 142.

However, the locking structure may also be disposed at the second locking recess 142, and the process that the locking structure locks the first locking recess 112 is similar to the process in the following.

Referring to FIGS. 1 to 3, in this embodiment, the pressing element 120 in the end opening 112a of the first locking recess 112 is aligned to the bottom part 114 of the body 110, as shown in FIG. 3, and is adapted to move along the vertical axial direction D1 into the first locking recess 112. Accordingly, the configuration of the pressing element 120 does not cause interference when the user wears the wearable electronic device 100, and the user may simply press with his/her finger to easily operate the pressing element 120. Correspondingly, the locking element 130 in the end opening 112b of the first locking recess 112 protrudes from the side part 116 of the body 110 (as shown in FIG. 3), and is driven by the pressing element 120 to move along the horizontal axial direction D2 into the first locking recess 112. Accordingly, the locking element 130 protruding from the side part 116 may move into the first locking recess 112 to allow the annular frame 144 of the wearable element 140 to pass through the side part 116. The locking element 130 then moves outward from the first locking recess 112 to lock the second locking recess 142 of the wearable element 140. The process of moving the locking element 130 into the first locking recess 112 may be achieved by a process linked to the process that the user pushes the wearable element 140 or applies a force on the pressing element 120, so that the wearable element 140 is assembled to or detached from the body 110.

Accordingly, in this embodiment, when the wearable element 140 is to be assembled to the body 110, the wearable element 140 firstly approaches the body 110 along the vertical axial direction D1 and pushes the locking element 130 protruding from the side part 116. Due to limitation of the end opening 112b, the pushed locking element 130 moves into the first locking recess 112 along the horizontal axial direction D2 until the locking element 130 completely moves into the first locking recess 112 and the annular frame 144 of the wearable element 140 is allowed to pass through the side part 116. The process is shown from FIGS. 3 to 4. Due to a tolerance or a structural factor, the locking element 130 may slightly move into a space accommodating the restoring element 150 (i.e., a bottom part of the first locking recess 112) when moving into the first locking recess 112. Under such circumstance, the locking element 130 may be slightly flipped inwardly, making the center of mass of the locking element 130 unable to completely move along the horizontal axial direction D2. However, such deviance from the horizontal axial direction D2 is minor and neglectable. Thus, in general, the locking element 130 may still be considered as moving along the horizontal axial direction D2.

At the same time when the locking element 130 is being pushed by the wearable element 140, the pressing element 120 connected to the locking element 130, without being pressed, is also driven by the locking element 130. Also, due to limitation of the end opening 112a, the pressing element 120 moves along the vertical axial direction D1 into the first locking recess 112, and thereby pushes the restoring element 150 to accumulate the restoring force. In other words, even though the pressing element 120 is not pressed, because the pressing element 120 and the locking element 130 are connected to each other and have a linking relation, the pressing element 120 still correspondingly moves along the vertical axial direction D1 into the first locking recess 112 when the locking element 130 is pushed to move along the horizontal axial direction D2 into the first locking recess 112. Meanwhile, the pressing element 120 also pushes the restoring element 150 in the first locking recess 112 to accumulate the restoring force. The restoring force constantly drives the pressing element 120 to move outward from the first locking recess 112 along the vertical axial direction D 1. However, in this state, the pressing element 120 is under the limitation that the wearable element 140 presses the locking element 130 and thus not moved by the restoring force.

Then, when the wearable element 140 moves until the second locking recess 142 corresponds to the locking element 130 in the first locking recess 112, the wearable element 140 no longer presses the locking element 130, thereby removing the limitation on movement of the locking element 130 and the pressing element 120. Thus, by releasing the restoring force, the restoring element 150 may drive the pressing element 120 to restore to the original position in the opposite direction along the vertical axial direction D1, and the pressing element 120 may simultaneously drive the locking element 130 to move along the horizontal axial direction D2. The process is shown from FIGS. 4 to 5. In other words, the wearable element 140 may be easily assembled to the body 110 by pushing the locking element 130 to move along the horizontal axial direction D2 into the first locking recess. Then, the locking element 130 moved into the first locking recess 112 by being pushed by the wearable element 140 may be automatically move outward from the first locking recess 112 along the horizontal axial direction D2 with the restoring force of the restoring element 150 and the linkage with the pressing element 120, thereby being fitted into the second locking recess 142. In this way, the wearable element 140 is assembled on the body 110 to form the wearable electronic device 100.

More specifically, in this embodiment, the wearable element 140 has a guiding part 148 near the second locking recess 142, and the locking element 130 has a first inclined surface 132 facing outside of the first locking recess 112 and corresponding to the guiding part 148. When the wearable element 140 moves along the vertical axial direction D1 with respect to the locking element 130, the guiding part 148 moves along the first inclined surface 132 and pushes the locking element 130 to move along the horizontal axial direction D2 into the first locking recess 112. Thus, with the design of the first inclined surface 132, the movement of the wearable element 140 along the vertical axial direction D1 may be converted into the movement of the locking element 130 along the horizontal axial direction D2. After the guiding part 148 leaves the first inclined surface 132, the locking element 130 corresponds to the second locking recess 142. Thus, the locking element 130 may be driven by the pressing element 130 and the restoring element 150 to move outward from the first locking recess 112 in the opposite direction along the horizontal axial direction D2 to lock the second locking recess 142. Similarly, in an embodiment where the locking structure (including the pressing element 120, the locking element 130, and the restoring element 150) is disposed in the second locking recess 142, the body 110 may also include a guiding part disposed near the first locking recess 112 to push the locking element 130 into the second locking recess 142 along the first inclined surface 132 of the locking element 130 when the locking element 140 and the body 110 are assembled. It should be noted that the invention is not limited to the above embodiments.

Figure 6:
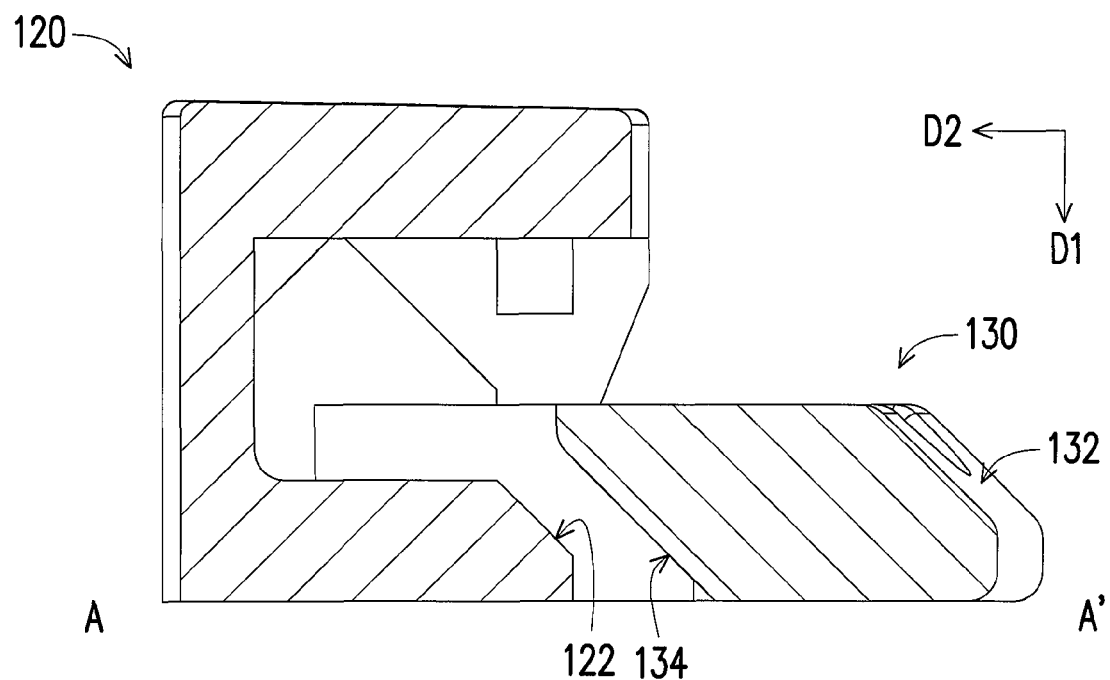
FIG. 6 is a schematic cross-sectional view of the wearable electronic device of FIG. 2 taken along Line A-A'.
Figure 7:
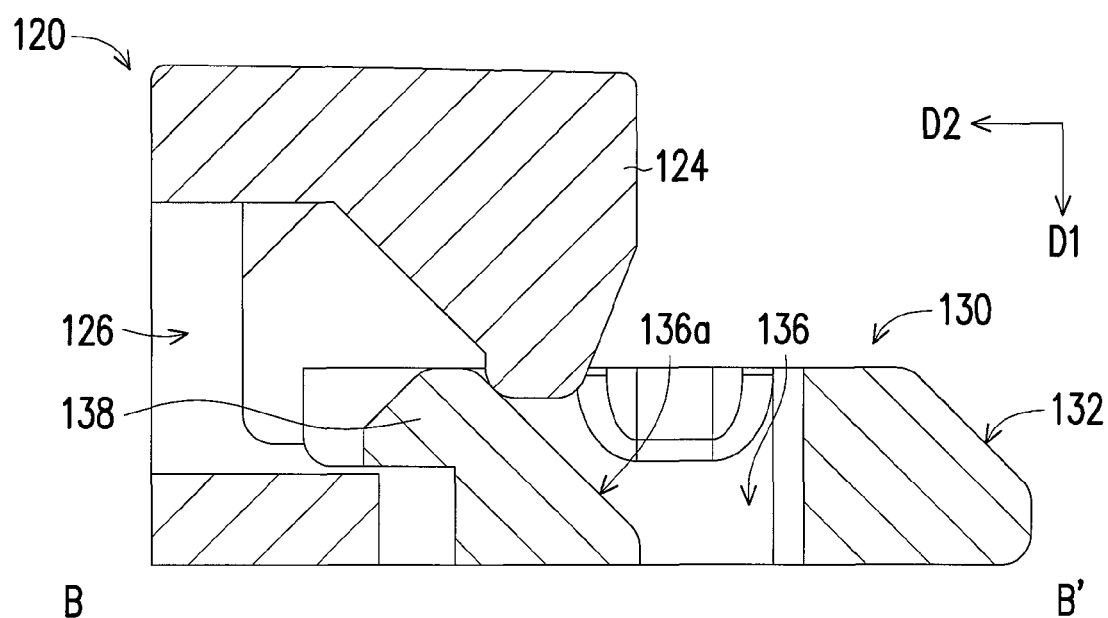
FIG. 7 is a schematic cross-sectional view of the wearable electronic device of FIG. 2 taken along Line B-B'.

Then, referring to FIG. 6, FIG. 6 is a schematic cross-sectional view of the wearable electronic device of FIG. 2 taken along Line A-A'. In this embodiment, the pressing element 120 has a second inclined surface 122 corresponding to the locking element 130, and the locking element 130 has a third inclined surface 134 corresponding to the pressing element 120. The second inclined surface 122 and the third inclined surface 134 correspond to each other. Also, the second inclined surface 122 and the third inclined surface 134 may be tightly fit to each other or may keep a fine gap therebetween. When the locking element 130 is pushed by the wearable element 140 to move along the horizontal axial direction D2 into the first locking recess 112, the third inclined surface 134 approaches the second inclined surface 122 to push the second inclined surface 122, thereby driving the pressing element 120 to move along the vertical axial direction D1 into the first locking recess 112 and pushing the restoring element 150 to accumulate the restoring force. When the restoring element 150 drives the pressing element 120 to restore to the original position in the opposite direction along the vertical axial direction D1, the second inclined surface 122 pushes the third inclined surface 134, making the pressing element 120 drive the locking element 130 to move outward from the first locking recess 112 where the locking structure is located along the horizontal axial direction D2. In other words, a process that the locking element 130 moves outward from the first locking recess 112 through driving of the pressing element 120 and the restoring element 150 may be achieved by the second inclined surface 122 pushing the third inclined surface 134.

Therefore, in this embodiment, with the design of the second inclined surface 122 and the third inclined surface 134, the movement of the locking element 130 along the horizontal axial direction D2 into the first locking recess 112 may be converted into the movement that the pressing element 120 moves along the vertical axial direction D1 into the first locking recess 112 and pushes the restoring element 150 to accumulate the restoring force, and the movement that the pressing element 120 restores to the original position in the opposite direction along the vertical axial direction D1 by using the restoring element 150 may also be converted into the movement that the locking element 130 moves outward from the first locking recess 112 in the opposite direction along the horizontal axial direction D2. Similarly, in the embodiment where the locking structure (including the pressing element 120, the locking element 130, and the restoring element 150) are disposed in the second locking recess 142, the process that the locking element 130 moves outward from the second locking recess 142 where the locking structure is located through driving of the pressing element 120 and the restoring element 150 may be achieved by the second inclined surface 122 pushing the third inclined surface 134. The invention is not limited to the above embodiments.

Similarly, when the user intends to remove the wearable element 140 from the body 110, the user may remove the wearable element 140 from the body 110 according to the sequence from FIG. 5 to FIG. 3 by applying a force to the pressing element 120. Specifically, referring to FIG. 2, FIGS. 3 to 5, and FIG. 7, FIG. 7 is a schematic cross-sectional view of the wearable electronic device of FIG. 2 taken along Line B-B'.

In this embodiment, the pressing element 120 has a guiding protrusive part 124 protruding toward the locking element 130, and the locking element 130 has a guiding recess part 136 corresponding to the guiding protrusive part 124. The guiding protrusive part 124 is fit to the guiding recess part 136. Then, the pressing element 120 has an opening 126, and the guiding protrusive part 124 is located at one side of the opening 126. The locking element 130 has an extended segment 138, and the guiding recess part 136 is located on the extended segment 138. The extended segment 138 is inserted into the opening 126, and the guiding protrusive part 124 is fit into the guiding recess part 136, making the pressing element 120 and the locking element 130 fit to each other.

More specifically, in this embodiment, the guiding recess part 136 has a fourth inclined surface 136a corresponding to the guiding protrusive part 124. When the pressing element 120 receives an external force and moves along the vertical axial direction D1 into the first locking recess 112 where the locking structure is located, the guiding protrusive part 124 moves along the fourth inclined surface 136a and pushes the locking element 130 to move along the horizontal axial direction D2 into the first locking recess 112 where the locking structure is located. It can be known that the locking element 130 is inserted into the opening 126 and assembled to the pressing element 120 with the extended segment 138, and the pressing element 120 is further fit into the guiding recess part 136 with the guiding protrusive part 124, making the locking element 130 and the pressing element 120 linked Accordingly, the pressing element 120 is adapted to push the guiding recess part 136 by moving the guiding protrusive part 124 along the fourth inclined surface 136a when receiving an external force to move along the vertical axial direction D1 into the first locking recess 112 where the locking structure is located, thereby driving the locking element 130 to move along the horizontal axial direction D2 into the first locking recess 112 where the locking structure is located. In other words, the linkage between the locking element 130 and the pressing element 120 may be achieved by using the guiding protrusive part 124 and the guiding recess part 136. In addition, with the design of the fourth inclined surface 136a, the movement that the pressing element 120 moves along the vertical axial direction D1 into the first locking recess 112 where the locking structure is located may be converted into the movement that the locking element 130 moves along the horizontal axial direction D2 into the first locking recess 112 where the locking structure is located. Similarly, in an embodiment where the locking structure (including the pressing element 120, the locking element 130, and the restoring element 150) are disposed in the second locking recess 142, the linkage between the locking element 130 and the pressing element 120 may be achieved by using the guiding protrusive part 124 and the guiding recess part 136. Also, with the design of the fourth inclined surface 136a, the movement that the pressing element 120 moves along the vertical axial direction D1 into the second locking recess 142 where the locking structure is located may be converted into the movement that the locking element 130 moves along the horizontal axial direction D2 into the second locking recess 142 where the locking structure is located. The invention is not limited to the above embodiments.

Accordingly, in this embodiment, when the user intends to remove the wearable element 140 (shown in FIG. 5) fixed to the body 110 from the body 110, the user may apply a force to the pressing element 120, such that the pressing element 120 moves along the vertical axial direction D1 into the first locking recess 112 and pushes the restoring element 150 to accumulate the restoring force. At this time, the pressing element 120 drives the locking element 130 to move into the first locking recess 112 by moving the guiding protrusive part 124 fit to the guiding recess part 136 along the fourth inclined surface 136a, such that the locking element 130 gradually moves out of the second locking recess 142 of the wearable element 140. The process is shown from FIG. 5 to FIG. 4. When the locking element 130 completely moves into the first locking recess 112, the locking element 130 is unlocked from the second locking recess 142, and the wearable element 140 may thus be detached from the body 110. Then, as long as the user stops applying a force to the pressing element 120, the pressing element 120 may restore to the original position in the opposite direction along the vertical axial direction D1 with the restoring force of the restoring element 150, and drive the locking element 130 to move outward from the locking recess 112 along the horizontal axial direction D2. The process is shown from FIG. 4 to FIG. 3.

Also, in this embodiment, when the locking element 130 is driven by the pressing element 120 (e.g., by adopting the design of the guiding protrusive part 124 and the guiding recess part 136) to move into the first locking recess 112 along the horizontal axial direction D2, the third inclined surface 134 approaches the second inclined surface 122. When the restoring element 150 drives the pressing element 120 to restore to the original position in the opposite direction along the vertical axial direction D1, the second inclined surface 122 pushes the third inclined surface 134, making the pressing element 120 drive the locking element 130 to move outward from the first locking recess 112 along the horizontal axial direction D2. Thus, the process that the locking element 130 moves outward from the locking recess 112 through driving of the pressing element 120 and the restoring element 150 may be achieved by the second inclined surface 122 pushing the third inclined surface 134.

It can be known that the wearable element 140 of this embodiment may simultaneously pushes the locking element 130 protruding from the side part 116 in the process of being assembled to the body 110, such that the locking element 130 moves into the first locking recess 112. Then, with the restoring force of the restoring element 150 and driving of the pressing element 120, the locking element 130 may automatically move outward from the first locking recess 112 and be fit to the second locking recess 142. Thus, the user only needs to push the annular frame 144 of the wearable element 140 onto the body 110 to make the locking element 130 automatically lock the second locking recess 142. Moreover, the pressing element 120 is adapted to move along the vertical axial direction D1 into the first locking recess 112 with an external force, and drive the locking element 130 to move along the horizontal axial direction D2 into the first locking recess 112, thereby making the locking element 130 unlocked from the second locking recess 142 and thus allowing the wearable element 140 to be detached from the body 110. Thus, the user only needs to apply a force to the pressing element 120 to unlock the locking element 130 from the second locking recess 142 and detach the wearable element 140 from the body 110. Also, the pressing element 120 and the locking element 130 may restore to the original positions by adopting the restoring element 150. Thus, the wearable element 140 of the wearable electronic device 100 may be replaced through simpler assembling and detaching processes. Similarly, in the embodiment where the locking structure (including the pressing element 120, the locking element 130, and the restoring element 150) is disposed in the second locking recess 142, the body 110 and the wearable element 140 may also be assembled together by adopting the processes and the design of the locking structure above.

Furthermore, in this embodiment, the body 110 has a seamless external surface. The first locking recess 112 is disposed on the seamless external surface, and the pressing element 120 and the locking element 130 are disposed on the seamless external surface and accommodated in the first locking recess 112. In other words, the first locking recess 112 is not a hole disposed on the body 110, but formed of a recess area at the outer side of the body 110. The description that the body 110 has the seamless external surface indicates that the outer surface of the body 110, including an inner side surface of the first locking recess 112, is seamless. The first locking recess 112 is actually located at an outer side of the case of the body 110. Accordingly, the body 110 of this embodiment has a water-proof property. Besides, since the case of the body 110 is seamless, and the first locking recess 112 is disposed on the seamless external surface, the pressing element 120 and the locking element 130 in the first locking recess 112 are also on the seamless external surface and located at the outer side of the case. Therefore, disposing the first locking recess 112, the pressing element 120, and the locking element 130 do not influence the water-proof property of the body 110. Similarly, in an embodiment where the locking structure (including the pressing element 120, the locking element 130, and the restoring element 150) are disposed in the second locking recess 142, the first locking recess 112 (for locking the locking element 130 in the second locking recess 142) may also be formed of the recess area at the outer side of the body 110, making the external appearance surface of the body 110 seamless.

In view of the foregoing, in the wearable electronic device of the invention, the body and the wearable element are suitable to be assembled and detached according to the practical needs, and the processes may be achieved with the locking structure (including the pressing element and the locking element). The locking structure may be disposed in one of the first locking recess of the body and the second locking recess of the wearable element. When the user intends to assemble the wearable element and the body, the user may push the wearable element into the body, so that the locking element may lock another of the first locking recess and the second locking recess to assemble the body and the wearable element together. When the user intends to detach the wearable element and the body, the user may apply a force to the pressing element, so that the pressing element moves into the first locking recess or the second locking recess where the locking structure is located and drives the locking element to move into the first locking recess or the second locking recess where the locking structure is located, thereby unlocking the wearable element. Afterwards, the pressing element and the locking element may automatically restore to the original positions by using the restoring element and according to the linkage between the locking element and the pressing element. Accordingly, the wearable element of the wearable electronic device of the invention may be replaced through simpler assembling and detaching processes.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wearable electronic device, comprising:
a body, having a first locking recess;
a wearable element, having a second locking recess; and
a locking structure, comprising a pressing element and a locking element connected to each other, wherein the locking structure is disposed in one of the first locking recess and the second locking recess, the locking element is adapted to lock the other one of the first locking recess and the second locking recess to assemble the body and the wearable element together, and the pressing element is adapted to receive an external force to move along a vertical axial direction into the first locking recess or the second locking recess where the locking structure is located, and drives the locking element to move along a horizontal axial direction perpendicular to the vertical axial direction into the first locking recess or the second locking recess where the locking structure is located, so as to unlock the body and the wearable element, and
wherein the wearable element comprises an annular frame and two wearable parts, the wearable parts are correspondingly disposed at two opposite outer sides of the annular frame, the first locking recess is located at an outer side of the body, the second locking recess is located at an inner side of the annular frame, and the body is adapted to be disposed in the annular frame and assembled to the wearable element by using the locking structure.

2. The wearable electronic device as claimed in claim 1, wherein the locking structure further comprises a restoring element disposed between the pressing element and the first locking recess or the second locking recess where the locking structure is located, wherein a restoring force of the restoring element accumulates when the pressing element moves along the vertical axial direction into the first locking recess or the second locking recess where the locking structure is located, and drives the pressing element to restore to an original position in an opposite direction along the vertical axial direction by releasing the restoring force.

3. The wearable electronic device as claimed in claim 2, wherein the locking structure is disposed in the first locking recess, the restoring element is located between the first locking recess and the pressing element, the pressing element is located in an end opening of the first locking recess and corresponds to a bottom part of the body, and the locking element is located in another end opening of the first locking recess, corresponds to a side part of the body, and is adapted to lock the second locking recess of the wearable element, such that the body and the wearable element are assembled together.

4. The wearable electronic device as claimed in claim 3, wherein the wearable element has a guiding part near the second locking recess, the locking element has a first inclined surface facing outside of the first locking recess and corresponding to the guiding part, the guiding part moves along the first inclined surface and pushes the locking element to move along the horizontal axial direction into the first locking recess when the wearable element moves along the vertical axial direction with respect to the locking element, and the locking element is driven by the pressing element and the restoring element to move outward from the first locking recess in an opposite direction along the horizontal axial direction to lock the second locking recess after the guiding part leaves the first inclined surface.

5. The wearable electronic device as claimed in claim 2, wherein the pressing element has at least one second inclined surface corresponding to the locking element, the locking element has at least one third inclined surface corresponding to the pressing element, the second inclined surface and the third inclined surface correspond to each other, and the second inclined surface pushes the third inclined surface when the restoring element drives the pressing element to restore to the original position in the opposite direction along the vertical axial direction, such that the pressing element drives the locking element to move outward from the first locking recess or the second locking recess where the locking structure is located along the horizontal axial direction.

6. The wearable electronic device as claimed in claim 2, wherein the pressing element has a guiding protrusive part protruding toward the locking element, the locking element has a guiding recess part corresponding to the guiding protrusive part, the guiding protrusive part is fit into the guiding recess part, such that the pressing element is adapted to drive the locking element to move along the horizontal axial direction into the first locking recess or the second locking recess where the locking structure is located when the pressing element receives the external force and moves along the vertical axial direction into the first locking recess or the second locking recess where the locking structure is located.

7. The wearable electronic device as claimed in claim 6, wherein the guiding recess part has a fourth inclined surface corresponding to the guiding protrusive part, and when the pressing element receives the external force to move along the vertical axial direction into the first locking recess or the second locking recess where the locking structure is located, the guiding protrusive part moves along the fourth inclined surface and pushes the locking element to move along the horizontal axial direction into the first locking recess or the second locking recess where the locking structure is located.

8. The wearable electronic device as claimed in claim 6, wherein the pressing element has an opening, the guiding protrusive part is located at a side of the opening, the locking element has an extended segment, the guiding recess part is located on the extended segment, the extended segment is inserted into the opening, and the guiding protrusive part is fit into the guiding recess part, such that the pressing element and the locking element are fit to each other.

9. The wearable electronic device as claimed in claim 1, wherein the body has a seamless external surface, the first locking recess is disposed on the seamless external surface, and the locking structure is disposed on the seamless external surface and accommodated in the first locking recess.

* * * * *